Oct. 29, 1929.  G. EGLOFF ET AL  1,733,656
PROCESS FOR THE CONVERSION OF HYDROCARBON OIL
Original Filed July 24, 1922
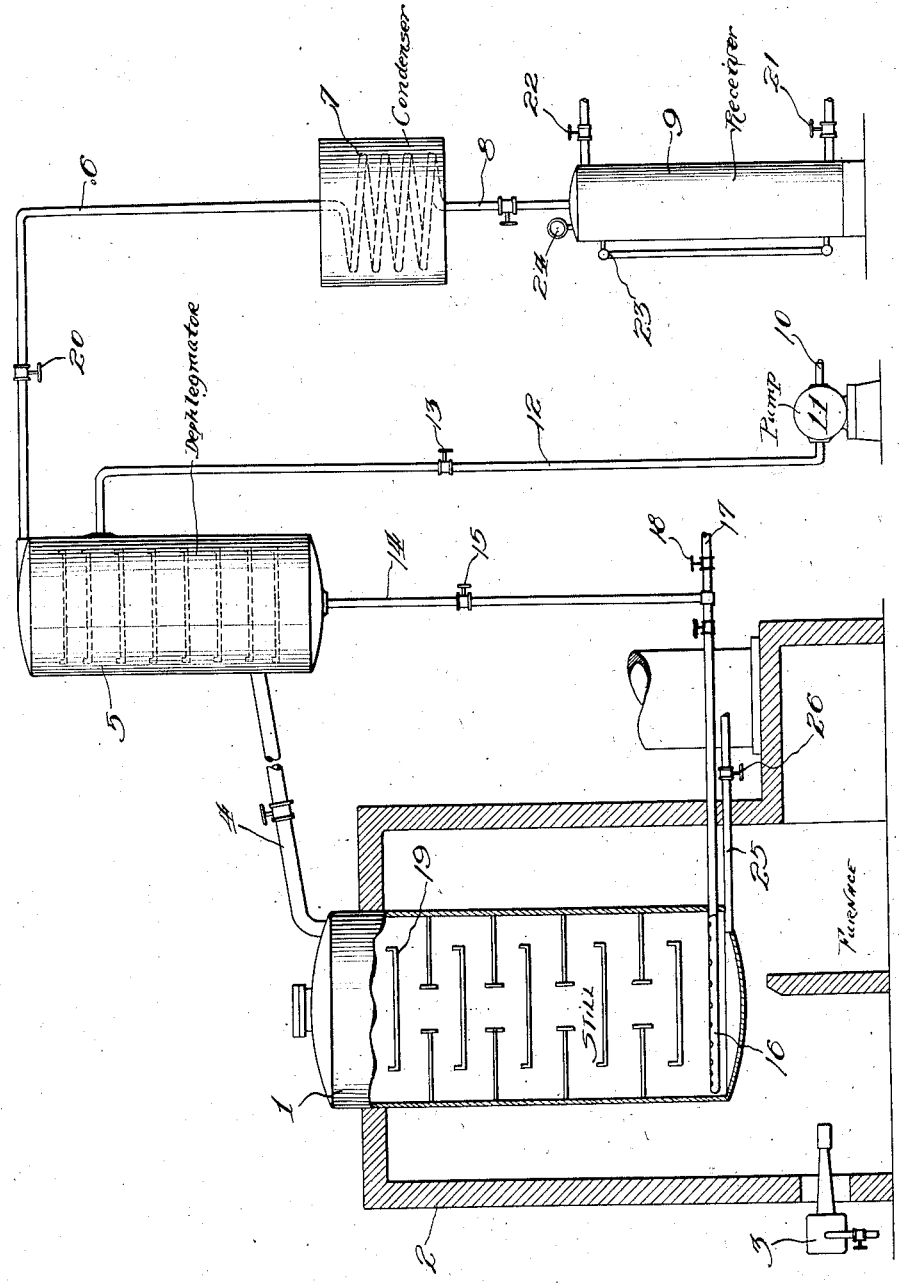
Inventors:
Gustav Egloff,
Jacque C. Morrell.
by Frank L. Belknap
Atty.

Patented Oct. 29, 1929

1,733,656

UNITED STATES PATENT OFFICE

GUSTAV EGLOFF AND JACQUE C. MORRELL, OF CHICAGO, ILLINOIS, ASSIGNORS TO UNIVERSAL OIL PRODUCTS COMPANY, OF CHICAGO, ILLINOIS, A CORPORATION OF SOUTH DAKOTA

PROCESS FOR THE CONVERSION OF HYDROCARBON OIL

Application filed July 24, 1922, Serial No. 577,237. Renewed March 18, 1929.

This invention relates to improvements in process for the conversion of hydrocarbon oil and refers more particularly to a process in which petroleum oil is converted into other compounds such as organic acids, ketones, aldehydes, alcohols and other oxidation products of the paraffin series of hydrocarbons and also the production of lighter hydrocarbons such as gasoline and gasoline-like products.

Among the objects of the invention are to provide a process in which the oil is treated in the presence of a catalytic material and a regulated quantity of an oxidizing gas such as air, oxygen, ozone, or oxides of nitrogen to form conversion products including oxidation compounds and lighter hydrocarbons; to provide a process which is preferably operated continuously and under a pressure of the generated vapors; and in general, to provide a process of the character referred to.

The single figure is a diagrammatic side elevational view of the apparatus with parts in section and parts broken away.

Referring to the drawings, the still 1 is mounted in a furnace 2 which is preferably heated by means of gas burners 3. The still is connected by vapor line 4 to a dephlegmating chamber or refluxing tower 5. The refluxing tower is connected by vapor line 6 to a condensing coil 7 which is in turn connected by pipe 8 to the receiving tank 9.

The oil to be treated is introduced from any convenient extraneous source through the line 10 and is charged by means of the pump 11 through the line 12 controlled by a valve 13 and is introduced near the top of the refluxing tower 5. In the refluxing tower it flows in an opposite direction to the oil vapors, thus supplying a refluxing medium for the heated hydrocarbon vapors and simultaneously therewith becoming preheated. The refluxed vapors separated out as condensate in the dephlegmating zone, are drawn off from the bottom of the dephlegmator through the line 14 in which is interposed a valve 15 and is directed to a perforated rose or spray pipe 16 positioned in the bottom of the still 1. An oxidizing gaseous medium such as air, ozone or oxygen may be introduced through the line 17 controlled by valve 18 and charged with the charging stock to the bottom of the still. The oil rising in the still is heated to a conversion temperature, the vapors passing off through the line 4 to the dephlegmating tower. In the still are horizontally positioned, spaced apart pans or trays 19, upon which are placed a catalyzing substance such as the oxides of meals—for example, copper oxide, barium peroxide and like substances. Some of the pans are immersed in the oil, while others are above the oil level. Thus the hydro-carbons are treated both in the liquid and in the vapor phase in their travel through the still. The introduction of the oil through the perforated pipe 16 serves to keep the oil in constant agitation, thus promoting a conversion and reaction taking place. The vapors which are not condensed in the dephlegmating zone pass over through the line 6 controlled by a valve 20 and after being condensed are collected in the receiving tank 9. This latter tank is equipped with a liquid draw-off valve 21, a pressure relief valve 22, liquid level gauge 23 and a pressure gauge 24. A draw-off line 25 controlled by a valve 26 is tapped into the bottom of the still 1 for drawing off from time to time the heavier residual substances which collect in the bottom of the still. Such oils as wax distillates, gas oil, kerosene and other like paraffin hydro-carbons are particularly fitted to be converted in a process of this character. A substantial yield of high quality products, together with considerable light hydro-carbons such as gasoline, may be produced.

By treating a wax distillate produced from Mid-Continent crude oil having a Baumé gravity of 28° at temperatures from 400° to 900° F., in the presence of a catalytic substance, a yield of 25% distillate was obtained and from 10 to 15% oxidation products procured. With certain oils, particularly the kerosene and wax distillates, treatment at a pressure both increases the yield and improves the quality of the products obtained.

We claim as our invention:

1. A process for treating hydrocarbon oil to produce a lower boiling point distillate and a substantial quantity of oxidation products, consisting in subjecting the oil, while under a superatmospheric pressure, to a temperature sufficiently high to cause substantial vaporization of the oil under such pressure, in effecting the heating of the oil and the vaporization thereof in the presence of a metallic oxide, in condensing the heavier fractions of the evolved vapors, in injecting into the condensed heavier fractions an oxidizing gas, and in then returning the condensed heavier fractions to the oil undergoing heat treatment in the process.

2. A continuous process for treating hydrocarbon oils to simultaneously produce therefrom a low boiling point distillate and a substantial quantity of oxidation products, consisting in maintaining a body of the oil under a superatmospheric pressure, in subjecting the body of oil to a temperature sufficiently high to cause substantial vaporization of the oil under such superatmospheric pressure, in effecting the heating of the oil and the vaporization thereof in the presence of a metallic oxide, in subjecting the vapors evolved from the oil to reflux condensation, to separate therefrom the heavier fractions, in effecting the reflux condensation of the vapors by introducing thereto controlled quantities of incoming charging oil for the process, in continuously supplying reflux condensate separated from the vapors and incoming charging oil to said body of oil, and in introducing to the reflux condensate and incoming charging oil an oxidizing gas.

3. A continuous process for treating hydrocarbon oils to simultaneously produce therefrom a low boiling point distillate and a substantial quantity of oxidation products, consisting in maintaining a body of the oil under a superatmospheric pressure, in subjecting the body of oil to a temperature sufficiently high to cause substantial vaporization of the oil under such superatmospheric pressure, in effecting the heating of the oil and the vaporization thereof in the presence of a metallic oxide, in subjecting the vapors evolved from the oil to reflux condensation, to separate therefrom the heavier fractions, in effecting the reflux condensation of the vapors by introducing thereto controlled quantities of incoming charging oil for the process, in continuously supplying reflux condensate separated from the vapors and incoming charging oil to said body of oil and in introducing to the reflux condensate and incoming charging oil an oxidizing gas, prior to the admission of the commingled incoming charging oil and reflux condensate to said body of oil, and in continuously removing heavy unvaporized constituents from said body of oil.

GUSTAV EGLOFF.
JACQUE C. MORRELL.